United States Patent [19]

Brewer

[11] 4,219,186
[45] Aug. 26, 1980

[54] LIFT TABLE AND COOPERATING WHEEL TRUCK ASSEMBLY

[75] Inventor: John Brewer, Scarborough, Me.

[73] Assignee: Southworth, Inc., Portland, Me.

[21] Appl. No.: 46,521

[22] Filed: Jun. 7, 1979

[51] Int. Cl.³ .............................................. B60P 1/00
[52] U.S. Cl. ..................................... 254/9 C; 414/498
[58] Field of Search ............... 414/495, 498; 254/2 R, 254/2 B, 2 C, 9 R, 9 B, 9 C, 122, 133–134, 45–50

[56] References Cited

U.S. PATENT DOCUMENTS

| | | | |
|---|---|---|---|
| 2,501,001 | 3/1950 | Neely | 254/122 |
| 2,920,871 | 1/1960 | Kolodin | 254/122 |
| 3,305,117 | 2/1967 | Ford | 414/498 |
| 3,948,403 | 4/1976 | Johansson | 414/495 |
| 4,077,535 | 3/1978 | Oriol | 414/498 |

*Primary Examiner*—Robert C. Watson
*Attorney, Agent, or Firm*—David H. Semmes; Warren E. Olsen

[57] ABSTRACT

A system for allowing a wheeled truck to cooperate with a relatively stationary lift table assembly, in order to selectively raise the truck during various material handling operations. The lifting combination essentially comprises a vertically extendable lift table assembly which cooperates with a wheeled truck which can be selectively superposed upon the lift table assembly. The lift table includes a scissor jack linkwork, and can be easily positioned, as necessary, within a material handling space. The wheeled truck includes means to engage guideways on the lift table assembly, as the truck is wheeled thereover to its selective engagement position.

3 Claims, 5 Drawing Figures

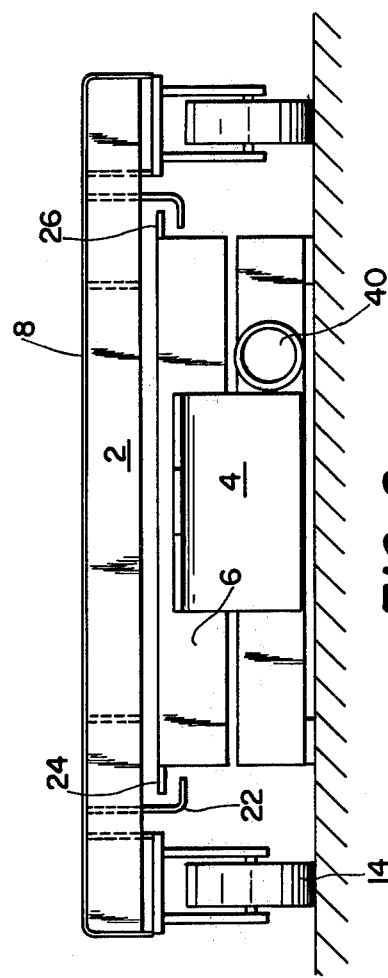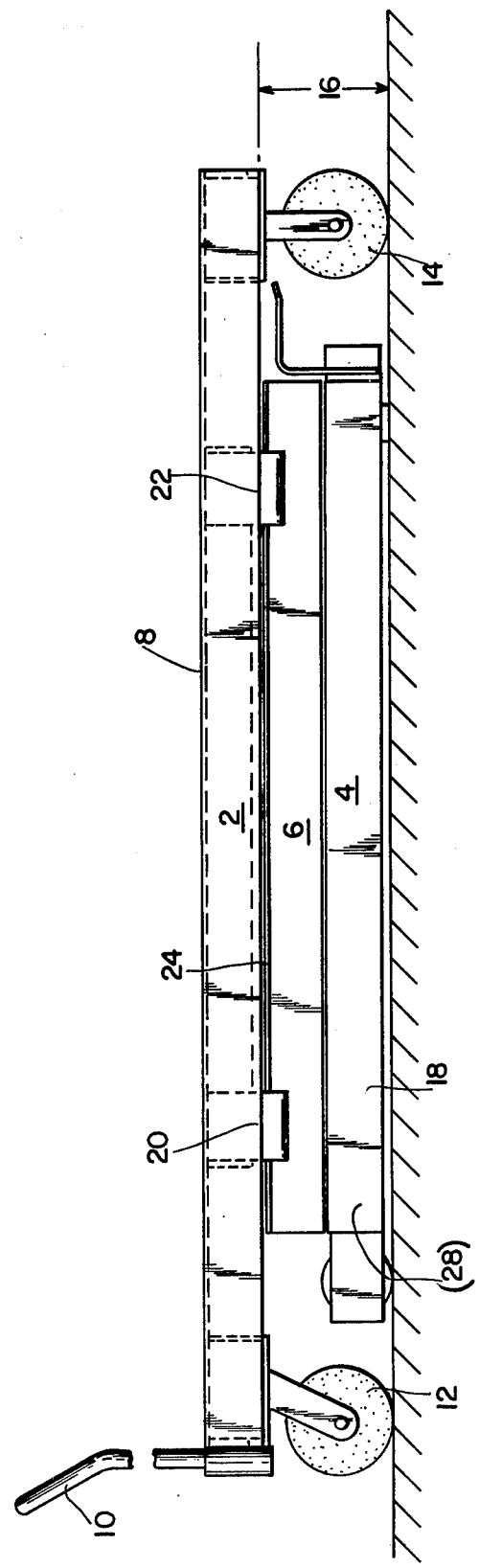

LIFT TABLE AND COOPERATING WHEEL TRUCK ASSEMBLY

BACKGROUND OF THE INVENTION

1. Field of the Invention

A system whereby a wheeled truck can be selectively placed into a superposed position upon a hydraulically-actuated lifting table assembly. When in position the lift table assembly mates to the truck, prior to lifting it to any desired vertical elevation. The present invention relates generally to a very efficient material handling system, and particularly a cooperation between a wheeled truck and a vertically extendable lift table assembly.

Lift tables per se are known in the prior art, and, of course, wheeled push-type trucks are also per se well known in the prior art. The present invention involves a synergistic cooperation between a modified form of wheeled truck, and a modified lifting table assembly, allowing increased efficiency in material handling, in environments such as supermarkets wherein small pallets must often times be lifted and moved at various locations.

2. Description of the Prior Art

Numerous devices are known in the prior art for allowing a table to be lifted to a vertical height. Applicant has conducted a search, and is aware of the following prior patents:

| | |
|---|---|
| Great Britain | 619,431 |
| Great Britain | 1,337,853 |
| Germany | 468,832 |
| King | Re. 27,914 |
| Sexton | 1,813,429 |
| Ross | 2,402,579 |
| Stewart | 2,489,056 |
| Saunders | 2,833,587 |

In summary, these noted patents illustrate various forms of elevating truck-like devices, though in each case the approach has been to incorporate an elevating mechanism upon a wheeled sub-carriage. In contrast, the present invention employs a single lifting table sub-carriage assembly, of essentially conventional construction, with the ability to cooperate with the underside of numerous wheeled truck assemblies. With this system a number of modified trucks can be selectively placed upon the lifting table, and the lifting table can be selectively moved to various positions, for example, to load various pallets at shelves in a supermarket environment.

The 1949 Great Britain Pat. No. 619,431 illustrates an elevated truck which is typical of systems wherein a single rolling mechanism is employed, for both lifting and movement of a truck. In contrast, the present concept devolves to mating a modified platform truck with an otherwise stationary lifting mechanism, for selective lifting of the truck.

Great Britain Pat. No. 1,337,853 shown another form of lifting truck, together with an hydraulic power cylinder, for lifting the carriage off the ground. This patent shows a specific improvement through a post, which allows pivoting of the truck, when in the raised position.

The German patent illustrates a prior art jack-like device, using a scissor mechanism to engage a separable platform-like member, for certain particular raising jobs. However, there is no suggestion of a system wherein wheel trucks are selectively mated to a lifting table, as taught herein.

The King patent shows yet another portable lifting table, with a particular form of linkage which reduces initial raising forces. Here again, the King patent illustrates the prior art approach of using a superposed lifting mechanism upon a rolling sub-frame, in complete distinction to the present system wherein a lift table is located below, and in mating relationship to a wheeled platform-truck.

The additionally noted references are supplied simply to further illustrate well-known forms of scissor mechanisms, and particularly scissor mechanisms for performing a jacking function, for lifting loads. In applicant's opinion, the prior art does not suggest combining a mating platform truck above a lifting table device, for a most economical and efficient raising of the truck to a desired elevation. These patents represent the prior art presently known to applicant, and collectively illustrate that the present invention involves a departure from prior thinking. This departure amounts to a savings, since only one lifting platform need be supplied, with perhaps several mating wheeled truck assemblies.

SUMMARY OF THE INVENTION

The present invention is a lifting combination which essentially comprises a vertically extendable lift table assembly, which will cooperate with a wheeled truck assembly that is operable to be selectively superposed upon the lift assembly. The lift table assembly itself consists of a horizontally extending working platform that is positioned, in the vertical sense, by a scissor jack linkwork assembly. The mechanism and lift table are per se conventional elements in the material handling field, and the present lift table assembly requires certain readily made modifications in order to perform its cooperative function in the combination claimed in the present application. The preferred embodiment lift table assembly includes at least one horizontally extending guideway upon the upper or working platform surface of the lift table assembly.

The second essential part of the combination for lifting taught herein is the wheeled truck assembly which consists of a load platform supported upon wheels which maintain the underside of the load platform at a particular first distance above the ground reference. This first distance is sized so as to be sufficient to allow each wheeled truck assembly to be horizontally wheeled into a superposed mating upon the working platform of the lift table assembly, when, and only when that lift table assembly is in a first lowered position. The underside of the wheeled truck assembly includes means to cooperatively engage the horizontally extending guideways on the lift table assembly, in an automatic fashion when the truck is wheeled over the lift table.

When the wheeled truck assembly is desired to be raised, it is simply selectively engaged with the top working platform of the lift table assembly, by wheeling the truck into a mating alignment which is ensured by the cooperation with the guideways. In the mating position, the entire combination can be raised to any desired vertical position by conventional actuation of the lifting table assembly. Of course, the truck can then be selectively wheeled away when the lift table is repositioned at the first, or lowered, position.

The present invention allows a very economical lifting system, since each of the wheeled assemblies does not have to include its own vertical extending device.

Accordingly, it is a primary object of the present invention to teach a system for material handling equipment, wherein modified wheeled trucks can be cooperatively mated with a lift table assembly, which itself can be moved to various locations in a plant or warehouse circumstance. It is a related object of the present invention to teach a manner of modifying certain known elements of material handling equipment, so as to allow a novel and synergistic cooperation of the two structures, into a singularly effectively lifting combination.

Other features, advantages and objects of the present invention will become more apparent from the detailed description which follows, wherein reference is made to the accompanying drawings.

BRIEF DESCRIPTION OF THE DRAWINGS

FIG. 1 is a side elevation view of a preferred embodiment of the invention, showing the two main functioning elements;

FIG. 2 is an end elevation view of the preferred embodiment of FIG. 1;

DESCRIPTION OF THE PREFERRED EMBODIMENT

The preferred embodiment of the present invention is shown in FIG. 1, in side elevation view. The lifting combination essentially comprises a vertically extendable lift table assembly 4, which cooperates with the wheeled truck assembly, 2. In FIG. 1 the wheeled truck, 2, is shown in its superposed relation upon the lift table assembly, and particularly with the underside of the wheeled truck spaced slightly above the working platform surface, 24, on the lift table assembly. The working platform, 24, is operable to be vertically extended by a scissor jack linkwork assembly, illustrated hereinafter. The working platform 6, can be vertically extended with respect to a lift table sub-carriage, identified as 18 in FIG. 1.

The wheeled truck assembly, 2, essentially comprises a load platform, 8, which is supported upon wheels, 12, 14, so that the load platform underside is maintained at a first distance above a ground reference, with this distance being noted in FIG. 1 as the dimension 16. This distance, 16, is spaced so as to allow the truck assembly to be horizontally wheeled into its superposed mating position which is shown in FIG. 1.

Figure 3:
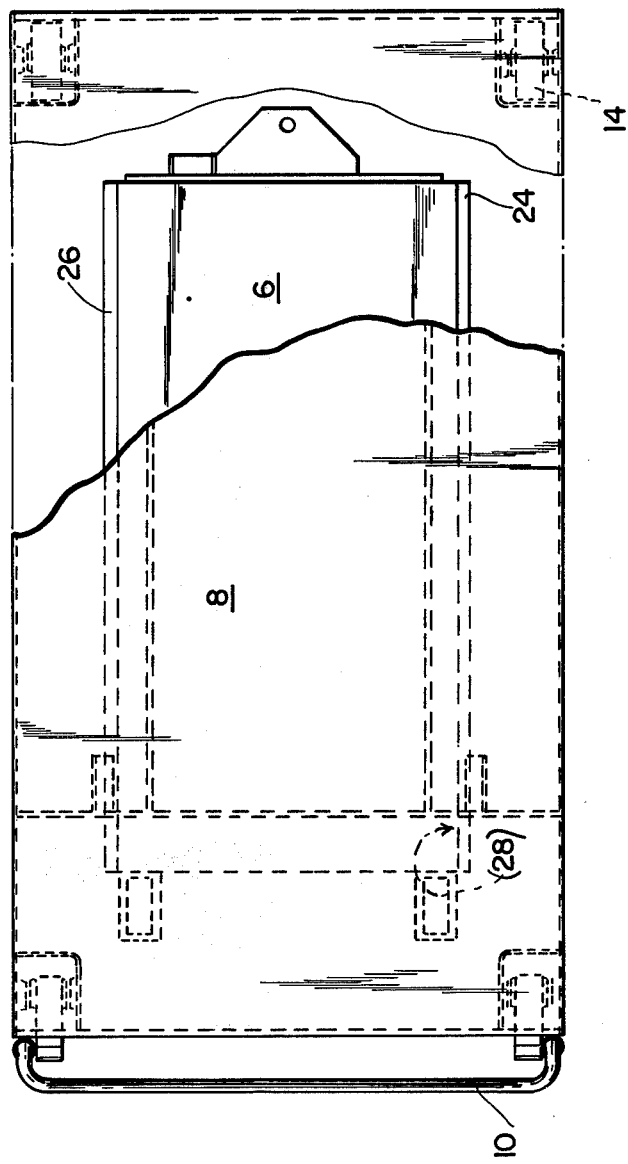
FIG. 3 is a top plan view of the preferred embodiment of FIG. 1, with a sectional view to further illustrate the mating cooperation between the two main elements.

The wheeled truck assembly includes means to engage a pair of horizontally extending guideways, as shown more particularly in FIGS. 2 and 3. The lift table work platform, 6, may include horizontally extending guides, which may be simply horizontally extending flanges, 24, 26, as shown most clearly in FIGS. 2 and 3. Cooperating with these horizontally extending guideways are preferably angle clips, 20, 22, which extend downwardly from the bottom of the load platform on the wheeled truck in order to define, with the underside of the wheeled truck, an inwardly open channel, as shown in FIG. 2. This inwardly open channel, accordingly, is operable to accept the longitudinally extending flanges, 24, 26, that are fixed to the work platform surface of the lifting table assembly. It can be readily appreciated that when the wheeled truck assembly is wheeled over the lifting table assembly in the lowered position of FIGS. 1 and 2, the channel defined from the underside of the wheeled truck cooperates with the longitudinally extending guideways to allow a longitudinal mating therebetween.

Figure 4:
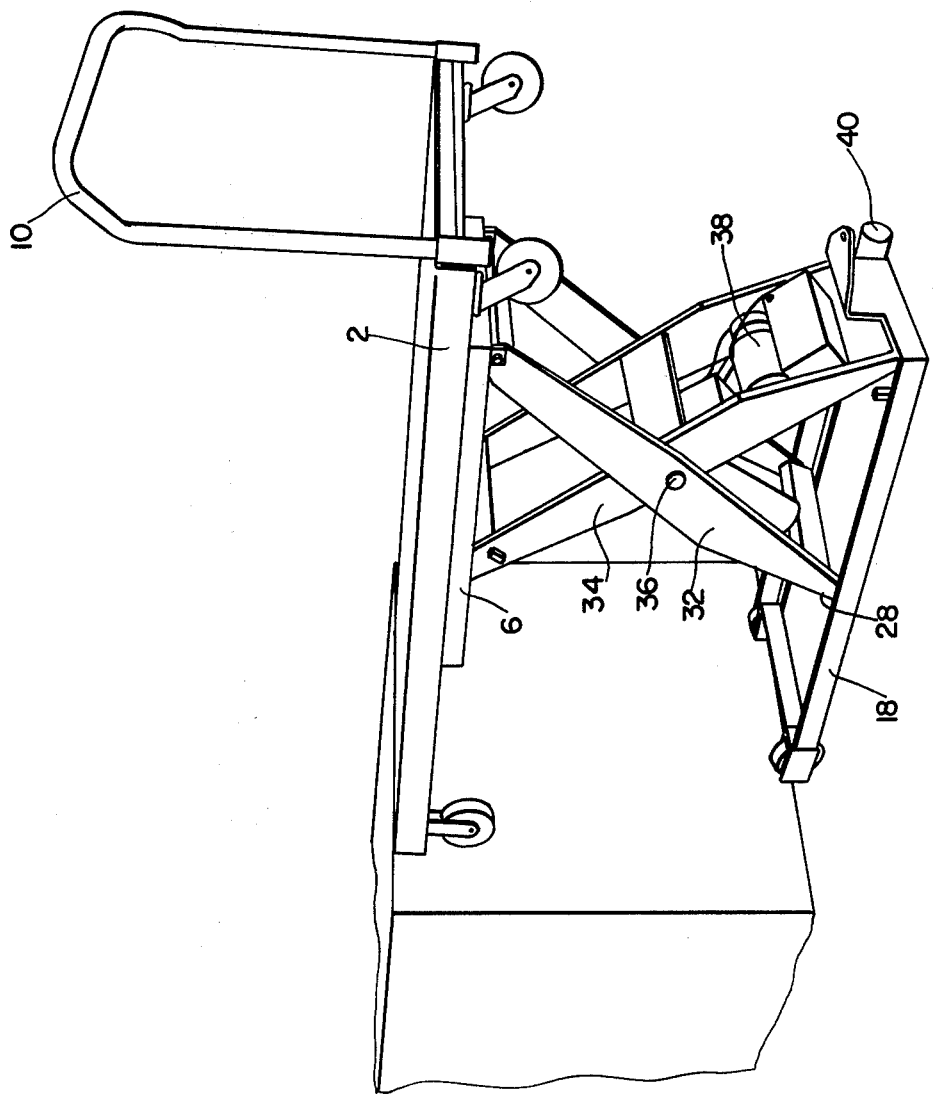
FIG. 4 is a perspective elevation view showing the lift table extended, and a wheeled truck in an elevated position.
Figure 5:
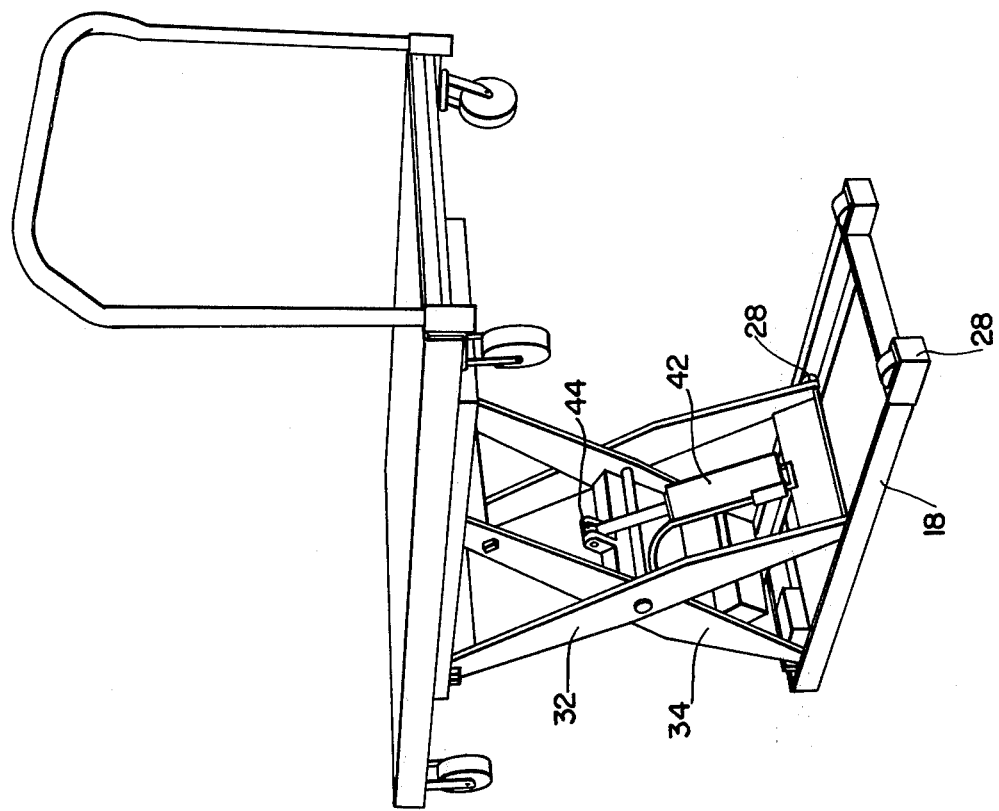
FIG. 5 is a second perspective elevation view of a preferred embodiment, further illustrating details of the scissor jack mechanism in the preferred embodiment.

In the preferred embodiment, the lift table assembly further comprises a sub-carriage support, 18, which may be independently moved in a horizontal manner, for placement at any point upon the ground reference which is shown in FIG. 1. It should be appreciated that the sub-carriage, 18, of the lifting table assembly shown includes a first link 32 with a first end that rolls or slides in a guide, 28, inside of sub-carriage, 18, as the work platform, 6, is elevated by extension of the linkwork. FIGS. 4 and 5 show a preferred linkwork assembly for the present lifting combination, wherein a single hydraulic cylinder is attached, at 44, to link 34. The first link, 32, pivots through a pin 36, with a second link, 34. In the preferred embodiment an hydraulic fluid is supplied through a circuit to the hydraulic cylinder, 42, by a conventional pump and hydraulic circuit arrangement, shown generally at 38, with an electric plug receptacle, 40. One end of the second link, 34, is fixed for rotation to the sub-carriage assembly, 18, and the other end is adapted for a slidable engagement in a longitudinally extending guide on the underside of the elevated working platform, 6, all as shown in FIGS. 4 and 5.

Accordingly, it should be appreciated that the present invention is a lifting combination which will be of great utility in the material handling environment, since a number of modified wheeled platform trucks can be used to mate with a single lifting platform. The present invention does not require a power source for each lifting truck, nor does it require any hydraulic power actuation for initially placing the wheeled vehicle over the lifting table. In other words, alignment of the wheeled truck over the lifting table can be done very easily in a manual fashion, without need to actuate the lifting table, if it is in the first lowermost position shown in FIG. 1. This is a safety considerable, since there is no need to accurately locate the two parts with hydraulic energizations, rather, a simple manual mating can be first accomplished, before any power is supplied to the lifting table assembly.

Certain adaptions and modifications of the invention will be apparent to those of ordinary skill in this art, and it is to be understood that the invention is to be limited solely by the scope of the appended claims.

I claim:

1. A lifting combination for handling material which is to be raised to any desired vertical elevation with respect to a ground reference which essentially comprises a vertically extendable lift table assembly and a cooperating wheel truck assembly, for handling said material, that is operable for a selective superposed mating upon said lift table assembly; wherein,
   (a) said lift table assembly comprises a horizontally extending working platform which is positioned above, and operable to be vertically extended by, a scissor jack linkwork assembly, said working platform further comprising at least one horizontally extending guideway and said lift table assembly further comprises a sub-carriage support for said scissor-jack linkwork assembly, said sub-carriage including means to allow independent horizontal movement and placement of said lift table upon said ground reference, either prior or during a mating engagement with said wheeled truck assembly; wherein, (b) said wheeled truck assembly comprises a load platform supported upon wheels which maintain the load platform at underside at a first distance above a ground reference, said first distance being sufficient to allow said truck assembly to be initially horizontally wheeled into a superposed mating to said working platform when said lift table assembly is in a lowered position, said wheeled truck assembly further including means to engage the horizontally extending guideway of said lift table assembly when wheeled thereover; whereby said wheeled truck assembly is operable to be selectively engaged with said working platform, raised to any desired vertical position thereby, and so enabling said material to be further handled, and said truck assembly then selectively wheeled away when said lift table is repositioned at said lowered position.

2. A lifting combination according to claim 1 wherein, said horizontally extending guideway further comprises a longitudinally extending flange on either side of said working platform, and said wheeled truck engaging means comprises angle clips which extend downwardly from said load platform to define, therewith, an inwardly open channel operable to accept the longitudinally extending flange on said work platform when said wheeled truck assembly is longitudinally mated thereon.

3. A lifting combination according to claim 1 wherein said scissor jack linkwork assembly includes a self-contained hydraulic actuating circuit and drive means for urging one link of said linkwork assembly in a pivoting relationship, wherein said one link has a first end which rotatably engages a fixed point on a sub-carriage support and an opposite end which slidably engages a longitudinally extending guide on the under side of said working platform.

* * * * *